United States Patent
Hansen et al.

(10) Patent No.: US 10,132,473 B2
(45) Date of Patent: Nov. 20, 2018

(54) PRISM EFFECT SYSTEM FOR LIGHT FIXTURE WITH INVERTED MULTI-FACET PRISMS

(71) Applicant: Martin Professional ApS, Aarhus (DK)

(72) Inventors: Claus Ellevang Hansen, Hornslet (DK); Nina Lillelund Kildeby, Gedved (DK)

(73) Assignee: MARTIN PROFESSIONAL APS., Aarhus (DK)

(*) Notice: Subject to any disclaimer, the term of this patent is extended or adjusted under 35 U.S.C. 154(b) by 0 days.

(21) Appl. No.: 15/187,692

(22) Filed: Jun. 20, 2016

(65) Prior Publication Data

US 2016/0377265 A1    Dec. 29, 2016

(30) Foreign Application Priority Data

Jun. 29, 2015 (DK) .................. 2015 70401

(51) Int. Cl.
*F21V 14/00* (2018.01)
*F21V 14/06* (2006.01)
(Continued)

(52) U.S. Cl.
CPC ............ *F21V 14/06* (2013.01); *F21S 10/007* (2013.01); *F21V 5/008* (2013.01); *F21V 5/02* (2013.01);
(Continued)

(58) Field of Classification Search
CPC ......... F21W 2131/406; F21W 2131/40; F21V 14/06; F21V 5/02; F21V 14/08; F21V 5/008; F21V 13/14; F21V 5/007
See application file for complete search history.

(56) References Cited

U.S. PATENT DOCUMENTS 5,113,332 A * 5/1992 Richardson ........... F21S 10/007
362/282
5,608,580 A * 3/1997 Quadri ..................... F21S 8/00
359/831
(Continued)

FOREIGN PATENT DOCUMENTS

| CN | 203718626 U | 7/2014 |
| CN | 203868942 A1 | 10/2014 |
| DE | 19533314 A1 | 3/1997 |

OTHER PUBLICATIONS

Extended European Search Report having Application No. 16174147.5, dated Jul. 26, 2016, 9 pages.

*Primary Examiner* — Christopher Stanford
(74) *Attorney, Agent, or Firm* — Artegis Law Group, LLP

(57) ABSTRACT

The present invention relates to a light fixture comprising at least one light source generating light; a light collector configured to collect at least a part of the light and to convert the light into a light beam propagating a long an optical axis, where the light beam is concentrated at an optical gate arranged along the optical axis and an optical assembly comprising at least one optical front lens. The optical assembly is configured to project at least a part of said light beam along said optical axis and the light fixture comprises a prism effect system. The prism effects system comprises a first prism comprising an entrance surface and a multi-faceted exit surface and a second prism comprising a multi-faceted entrance surface and an exit surface, where the first and second prism comprises an identical number of inverted facets.

14 Claims, 9 Drawing Sheets

(51) Int. Cl.

| | | |
|---|---|---|
| *F21V 9/40* | (2018.01) | |
| *F21V 5/00* | (2018.01) | |
| *F21V 5/02* | (2006.01) | |
| *F21V 7/06* | (2006.01) | |
| *F21V 13/14* | (2006.01) | |
| *F21S 10/00* | (2006.01) | |
| *F21V 5/04* | (2006.01) | |
| *F21V 11/10* | (2006.01) | |
| *F21V 14/08* | (2006.01) | |
| *G02B 26/00* | (2006.01) | |
| *F21W 131/406* | (2006.01) | |
| *F21Y 101/00* | (2016.01) | |

(52) U.S. Cl.
CPC ............... *F21V 5/048* (2013.01); *F21V 7/06* (2013.01); *F21V 9/40* (2018.02); *F21V 11/10* (2013.01); *F21V 13/14* (2013.01); *F21V 14/08* (2013.01); *G02B 26/008* (2013.01); *F21W 2131/406* (2013.01); *F21Y 2101/00* (2013.01)

(56) References Cited

U.S. PATENT DOCUMENTS

| | | | |
|---|---|---|---|
| 5,867,319 A * | 2/1999 | Sugiyama | G03F 7/70191 |
| | | | 359/618 |
| 6,897,942 B2 * | 5/2005 | Shiraishi | G03F 7/201 |
| | | | 355/53 |
| 8,480,260 B2 * | 7/2013 | Quadri | F21S 10/007 |
| | | | 362/281 |
| 2002/0085276 A1 * | 7/2002 | Tanitsu | G03F 7/70066 |
| | | | 359/432 |
| 2003/0197838 A1 | 10/2003 | Kohno | |
| 2006/0002109 A1 * | 1/2006 | Imade | H04N 9/3114 |
| | | | 362/231 |
| 2006/0187654 A1 * | 8/2006 | Jungel-Schmid | F21S 8/02 |
| | | | 362/147 |
| 2009/0268466 A1 | 10/2009 | Allegri | |
| 2010/0103677 A1 * | 4/2010 | Belliveau | F21V 5/04 |
| | | | 362/277 |
| 2014/0334007 A1 | 11/2014 | Monreal | |

* cited by examiner

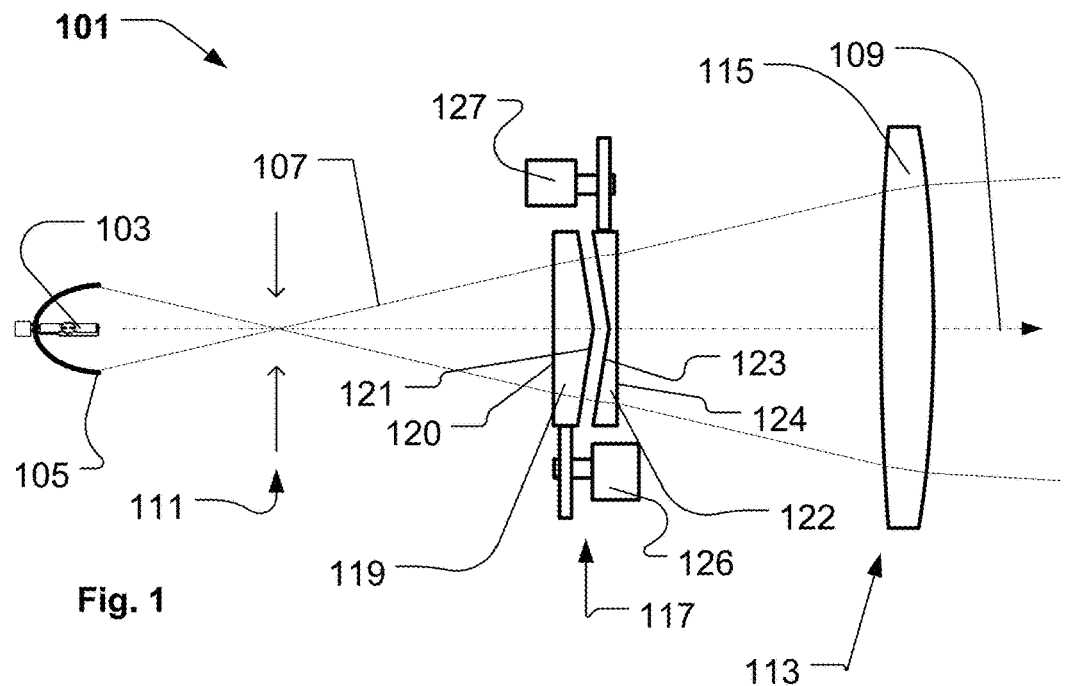
Fig. 1
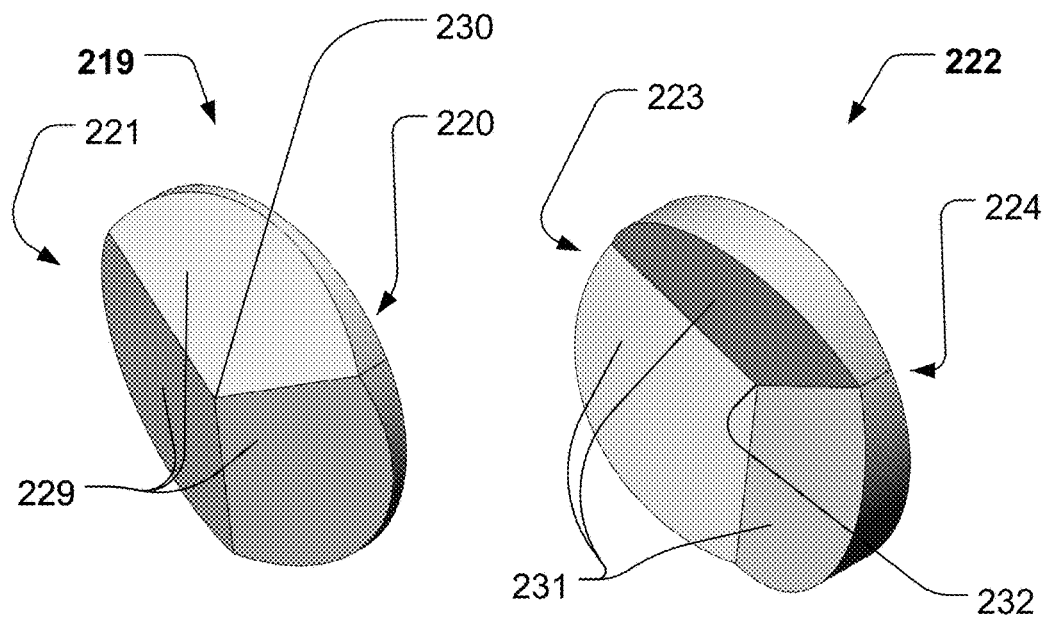
Fig. 2a
Fig. 2b

PRISM EFFECT SYSTEM FOR LIGHT FIXTURE WITH INVERTED MULTI-FACET PRISMS

CROSS-REFERENCE TO RELATED APPLICATIONS

This application claims priority to the Danish patent application titled, "PRISM EFFECT SYSTEM FOR LIGHT FIXTURE WITH INVERTED MULTI-FACET PRISM," filed on Jun. 29, 2015 and having Application No. PA 2015 70401. The subject matter of this related application is hereby incorporated herein by reference.

FIELD OF THE INVENTION

The present invention relates to a light fixture comprising at least one light source generating light; a light collector configured to collect at least a part of the light and to convert the light into a light beam propagating a long an optical axis, where the light beam is concentrated at an optical gate arranged along the optical axis and where an optical assembly comprises at least one optical front lens. The optical assembly is configured to project at least a part of said light beam along said optical axis and the light fixture comprises a prism effect system.

BACKGROUND OF THE INVENTION

In order to create various light effects and mood lighting in connection with concerts, live shows, TV shows, sport events or as a part of an architectural installation light fixtures creating various effects are getting more and more used in the entertainment industry. Typically entertainment light fixtures creates a light beam having a beam width and a divergence and can for instance be wash/flood fixtures creating a relatively wide light beam with a uniform light distribution or it can be profile fixtures adapted to project image onto a target surface.

Typically such light fixtures comprise a least one light source generating a light beam propagating along an optical axis and an optical assembly configured to project the light beam along the optical axis. Light fixtures for entertainment can comprise a number of light effect components which are configured to be inserted into the light beam in order to provide different light effects. The light effect components can for instance be any light effects known in the art of intelligent/entertainments lighting for instance, a CMY color mixing system, color filters, gobos, animation effects wheels, a iris diaphragms, a focus lenses, zoom lenses, prism effect components, framing e systems or any other light effects known in the art.

US2009/0268466 discloses a diffused light projector comprising: a light source; a main lens acting on the beam of light coming from the light source, said main lens being a Fresnel lens or a plano-convex lens to diffuse incident beam or beams of light; at least one prismatic lens located between the light source and the main lens to condition the beam of light coming from said light source.

US 2006/187654 discloses an architectural lighting system, including two alignedly arranged refractive elements whose centers are substantially located in the beam axis of a light source and one of which is mounted to be rotatable about said beam axis also the other refractive element is mounted to be rotatable about said beam axis, wherein drive means plus control means are associated with to the two refractive elements (9 for selective rotation in the same sense or in opposite senses, and both of the refractive elements are prism elements, wherein at least the two refractive prism elements are arranged in a common housing.

US2010103677 discloses a theatre lighting apparatus comprising a base, a communications port, a processor, a memory, and a lamp housing is disclosed. The lamp housing may include a lamp, a reflector, an output lens, a motor, and a homogenizing lens. The homogenizing lens may be comprised of a plurality of radially arranged lenticular lenses. The processor may be programmed to enable a motor to vary a position of the homogenizing lens in relation to a position of the output lens. The homogenizing lens may be comprised of a first half and a second half, each of which may have a plurality of radially arranged lenticular lenses.

Light designers and programmers want as many effects as possible in a light fixture as this give the light designer and programmers many options when creating light shows. Additionally light designers and programmers constantly desire to have new light effects which can be used to create light shows.

DESCRIPTION OF THE INVENTION

The object of the present invention is to provide a new light effect system. The new light effect is provided by a light fixture as described by the independent claims, which comprises a prism effects system comprising a first prism comprising an entrance surface and a multi-faceted exit surface and a second prism comprising a multi-faceted entrance surface and an exit surface, where the first and second prism comprises an identical number of inverted facets. The dependent claims describe possible embodiments of the present invention. The advantages and benefits of the present invention are described in the detailed description of the invention.

DESCRIPTION OF THE DRAWINGS

FIG. 1 illustrates a structural diagram of a light fixture comprising a prism effect system according to a first aspect of the present invention;

FIG. 2a-2b illustrate an inversed multi-faceted prism pair of a prism effect system according to the present invention;

DETAILED DESCRIPTION OF THE INVENTION

Figure 3A:
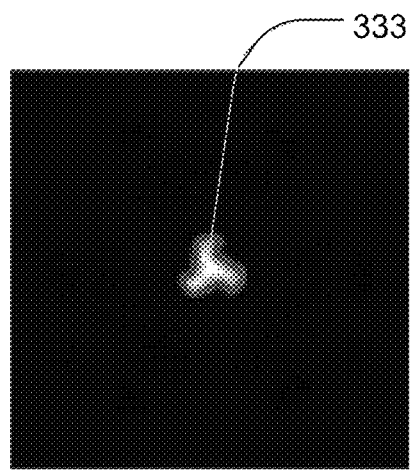
FIGS. 3a-3e illustrate grayscale images of the light distributions at a target surface a distance away from the optical front lens and at different stages of the first and second multi-facet prisms in relation to each other.

The present invention is described in view of exemplary embodiments only intended to illustrate the principles of the present invention. The skilled person will be able to provide several embodiments within the scope of the claims. In the illustrated embodiments the illustrated light beams and optical components do only serve to illustrate the principles of the invention rather than illustrating exact and precise light beams and optical components. Throughout the description the reference numbers of similar elements providing similar effects have been given the same last two digits.

The different features mentioned in the different embodiments can be combined with one another if not explicitly stated otherwise.

FIG. 1 illustrates a simplified embodiment of a light fixture 101 according to a first aspect of the present invention. The light fixture comprises at least one light source 103 generating light and a light collector 105 configured to collect at least a part of the light and to convert the light into a light beam 107 propagating a long an optical axis 109, where the light beam is concentrated at an optical gate 111 arranged along said optical axis.

The light source can be any known light source for instance incandescent lamps, discharge lamps, plasma lamps, LEDs, OLEDs, PLEDs, etc. or any combination thereof. It is also understood that any number of light sources can be used. In FIG. 1 the light source 103 is illustrated as a discharge lamp.

The light collector is configured to collect light and convert the light into a light beam propagating along the optical axis 111. The light collector can be any optical components capable of modifying the light for instance optical lenses, reflectors, light mixing rods, TIR lenses etc. or combination thereof. It is to be understood that the illustrated light beam only serves to illustrate that the light beam propagates along the optical axis. In FIG. 1 the light collector 105 is an elliptic reflector configured to concentrate the collected light at the optical gate 111.

The optical gate 111 is illustrated as an aperture where the light beam is concentrated and in theory the light beam can be focused in a single focal point, however in practice the light beam is focuses in focus range and the optical gate defines such focus range. As known in the art of entertainment lighting it is possible to arrange a number of beam modifying objects near the optical gate in order to shape the light beam for instance in order to create a light pattern which is imaged a target surface along the optical axis. The light modifying object (not shown) can be any light modifying component known in the art for instance gobos, animation wheel, Digital light processor (DLP) such as Digital micro-mirror device DMD, liquid-crystal display LCD etc.

The light fixture comprises also an optical assembly 113 configured to collect and project at least a part of the light beam along the optical axis 109. The optical assembly can comprise any kind of optical components and comprises at least one optical front lens 115. The optical assembly can comprise an additional number (not shown) of optical components for instance zoom optics used to adjust the beam width and/or diverges of the light beam or focusing optics used to focus an image of a beam modifying object arranged near the optical gate at an image point along the optical axis as known in the art of projecting devices. The focusing optics can also be configured to focus the images at different positions along the optical axis 109.

The light fixture comprises a prism effect system 117 arranged between the optical gate 122 and the optical front lens 115. The prism effect system comprises a first multi-faceted prism 119 and a second multi-faceted prism 122.

The first multi-faceted prism comprises an entrance surface 120 and a multi-faceted exit surface 121 and the second multi-faceted prism comprises a multi-faceted entrance surface 123 and an exit surface 124. The entrance surface 120 of the first prism faces towards the light source 103 and the multi-faceted entrance surface 123 of the second prism faces the multi-faceted exit surface 121 of the first prism. As a consequence the light beam enters the prism effect system through the entrance surface 120 of the first multi-faceted prism 119 and propagates through the first multi-faceted prism 119, where it exits the first multi-faceted prism 119 through the multi-faceted exit surface 121. Then the light enters the second multi-faceted prism 122 through the multi-faceted entrance surface 123 and propagates through the second multi-faceted prism 122 where it exits the prism effect system prism 117 through the exit surface 124 of said second multi-faceted prism 122. The light experiences a number of refractions while propagating through the prism effect system and different parts of the light beam experiences differs refractions due to the arrangement of the different facets inside the light beam. As consequence a new and interesting light effect can be created.

The multi-faceted exit surface of the first prism and the multi-faceted entrance surface of the second prism comprise an identical number of inverted facets, meaning that the number of facets at the exit surface of the first prism and the number of facets at the entrance surface of the second prism is the same. That the facets of the exit surface of the first prism and the facets of the entrance surface of the second prism are inverted means that the optical power of the multi-faceted exit surface and the optical power of the multi-faceted entrance surface have the same value but have opposite signs. As a consequence the optical refractions provided by the facets of the exit surface of the first prism and the facets of the entrance surface of the second prism can be eliminated by aligning the facets adjacent and close to each other, such that the facets are arranged in pairs having substantially parallel facet planes. The first prism and the second prism can thus be arranged in a neutral state where the optical effect of the first prism and second prism substantially eliminate one another.

The first prism and the second prism are rotatable in relation to each other around the optical axis. As a consequence the facets of the multi-faceted exit surface 121 and the facets of the multi-faceted entrance surface 123 can be rotated relative to each other causing the angles of the facets planes to change in relation to each other and the first and second prisms are thus brought out of the neutral state and into a split state. The result is the fact that light exiting the multi-faceted exist surface of the first prism will hit two different facets of the multi-faceted entrance surface of the second prism. The light refracted by each of the facets of the multi-faceted exit surface will thus be refracted into two different directions forming two different split light beams.

Continuous rotation of the first and second prisms in relation to each other moves the prisms from the neutral state to the split state and back to another neutral state and then to a split state and so forth. The number of facets defines the number of neutral states that are present per one revolution of the first and second prism in relation to each other. For instance 3-facet prisms will be brought into a neutral state every time the prisms have rotated 120 degrees in relation to each other; 4-facet prisms will be brought into a neutral state every time the prisms have rotated 90 degrees in relation to each other; 5-facet prisms will be brought into a neutral state every time the prisms have rotated 72 degrees in relation each to other and so forth.

Rotating the first prism and second prism out of a neutral state result in the fact that the facets of the exit surface and the entrance surface are angled in relation to each other and the refractive effect provided by the facets is increased. This causes the split light beams to separate from each other. The separation of the split light beam parts increase until they reach a maximum separation state which occurs, when the first prism and second prism are rotated into the angular positions halfway between two natural states. For instance two 3-facet prisms will be brought into a maximum separation state every time the prisms have rotated 60 degrees in relation to each other and in relation to a neutral state; two 4-facet prisms will be brought into a maximum separation state every time the prisms have rotated 45 degrees in relation to each other and in relation to a neutral state two 5-facet prisms will be brought into a maximum separation state every time the prisms have rotated 36 degrees in relation to each other and in relation to a neutral state and so forth.

The light fixture comprises a first prism actuator 126 configured to rotate the first prism 119 around the optical axis and a second prism actuator 127 configured to rotate the second prism 122 around the optical axis. This can for instance be embodied as known in the art of rotating prisms in an entertainment light fixture. For instance as described in the prior art documents US2009/0268466, US2006/187654 or US2010103677. In one embodiment the first and second multi-faceted prisms can be arranged in a bearing having a toothed flange which interacts with a toothed wheel rotatable by a corresponding actuator or alternatively by rotating the prism in a bearing using a belt mechanism. It is also possible to arrange the multi-faceted prisms on mechanisms allowing to move the multi-facets prism out of the light beam. The multi-faceted prism can also be arranged on a prism wheel where a plurality of different multi-faceted prism are arranged for instance as shown in US2009/0268466. Providing actuators rotating the first and second multi-faceted prisms makes it possible to rotate the multi-faceted prisms individually and independently in relation to each other. For instance it is possible to rotate the multi-faceted prisms in relation to each other whereby the light effect with separated split light beams as described above can be created. Additionally it is also possible to rotate the multi-faceted prism at the same angular speed whereby the prisms are kept in the same state in relation to each other, for instance it is possible to maintain the first and second multi-faceted prisms in a maximum separation state and then rotate the split light beams around the optical axis without changing the mutual separation to the separated light beam parts.

It is also noticed that the prism effect system according to the present invention can be embodied by fixing one of the multi-faceted prisms while rotating the other multi-faceted prism in relation to the fixed multi-faceted prism.

FIGS. 2a and 2b illustrate an inversed multi-faceted prism pair of a prism effect system according to the present invention, where FIG. 2a illustrates a first multi-faceted prism 219 and FIG. 2b illustrates a second multi-faceted prism 222.

The entrance surface 220 of the first multi-faceted prism is provided as a flat surface and the multi-faceted exit surface 221 comprises three exit facets 229. The three exit facets are provided in a convex setting where the exit facets meet in a common point 230 protruding in relation to the prism.

The exit surface 224 of the second multi-faceted prism is provided as a flat surface and the multi-faceted entrance surface 223 comprises three entrance facets 231. The three entrance facets are provided in a concave setting where the exit facets meet in a common point 232 depressing into the second prism.

Figure 3B:
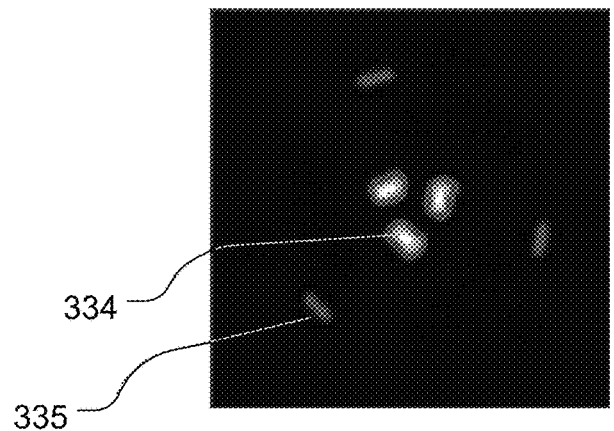
Figure 3C:
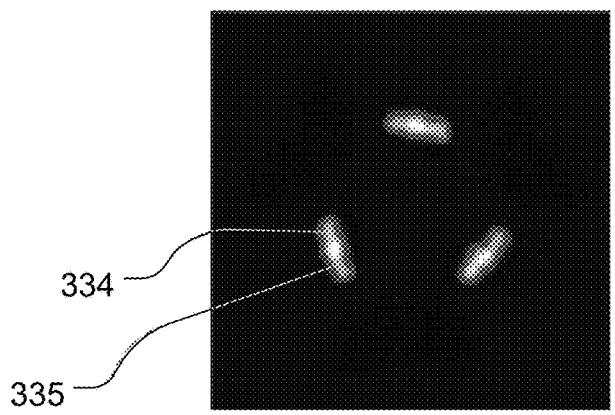
Figure 3D:
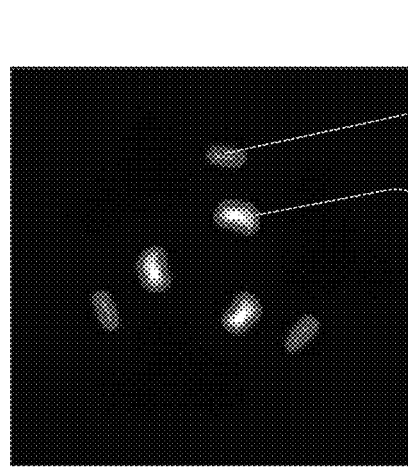
Figure 3E:
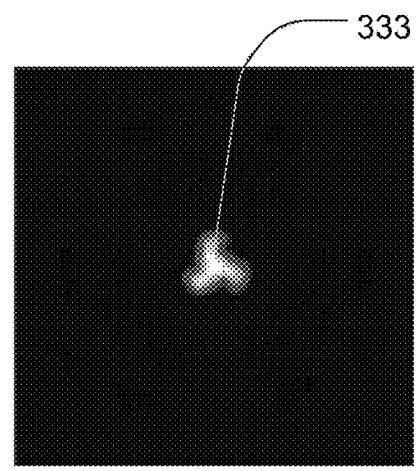

FIGS. 3a-3e illustrate grayscale images of the light distributions at a target surface a distance away from the optical front lens of a light fixture according to the present invention. The grayscale images have been obtained through an optical simulation software tool where the light distributions of a light fixture similar to the light fixture shown in FIG. 1 have been provided. The light fixture comprises a prism effect system comprising the 3-facets prisms shown in FIG. 2a-2b. FIG. 3a illustrates the light distribution where the first multi-faceted prism and the second multi-faceted prism are arrange in a neutral state, FIG. 3b illustrates the light distribution where the first and second multi-faceted prism have been rotated 30 degrees in relation to each other and in relation to the neutral state; FIG. 3b illustrates the light distribution where the first and second multi-faceted prism have been rotated 60 degrees in relation to each other and in relation to the neutral state; FIG. 3c illustrates the light distribution where the first and second multi-faceted prism have been rotated 90 degrees in relation to each other and in relation to the neutral state. FIG. 3e illustrates the light distribution where the first multi-faceted prism and the second multi-faceted prism are arranged in a neutral state but rotated 120 degrees in relation to the neutral state in FIG. 3a.

The light distributions illustrate that a number of bright spots can be created and that the bright spots move when the first and second multi-faceted prism are rotated in relation to each other. The bright spots correspond to the different split light beams that are created upon rotation of the first and second multi-faceted prism in relation to each other.

In the neutral state illustrated in FIG. 3a the light fixture creates substantially one light beam illustrated by the fact that that a central bright spot 333 is illustrated at the center of the light distribution. In FIG. 3b it can be seen that three inner spots 334 have been created and that three outer spots 335 have been created. Upon rotation of the multi-faceted prisms the inner spots 334 move outwardly in relation to the center of the light distribution and the outer spots move 335 inwardly in relation to the center of the light distribution. In FIG. 3c the first and second multi-faceted prisms have been rotated halfway between two neutral states and the outer spots and the inner spots cross each other and are arranged at substantially the same distance from the center. In FIG. 3d the outer spots 335 have moved even closer to the center and the inner spots 334 have moved even further away from the center. In FIG. 3e the prisms are rotated into the next neutral state and a central bright spot has been created. By rotating the prism continuously in relation to each other makes it possible to make dynamical light beam effects.

Figure 4:
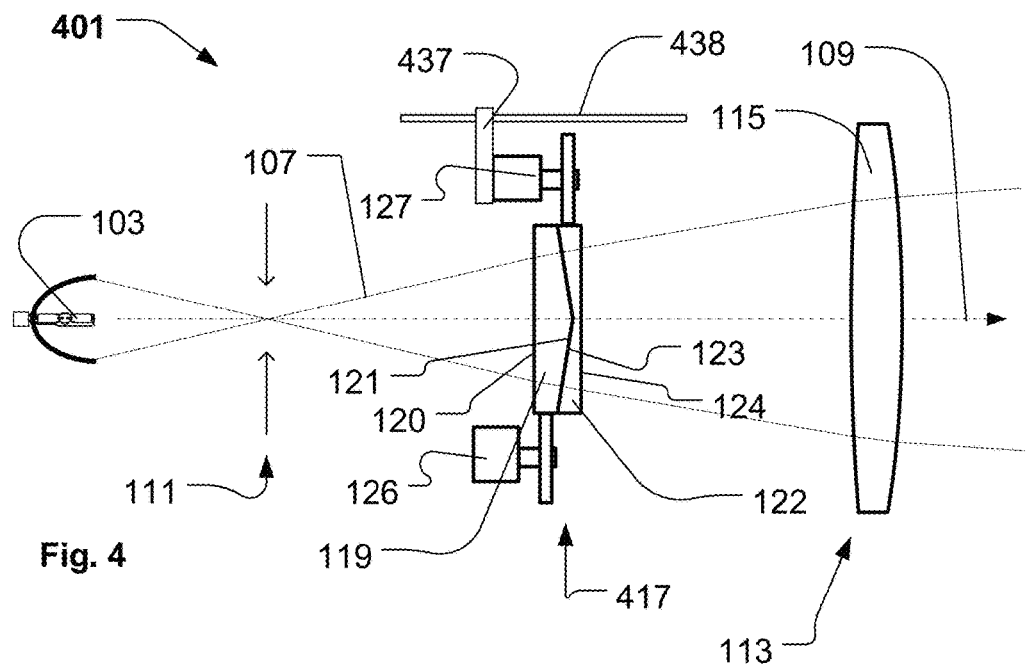
FIG. 4 illustrates a structural diagram of another embodiment of a light fixture comprising a prism effect system according to the first aspect of the present invention.

FIG. 4 illustrates a simplified structural diagram of another embodiment of a light fixture comprising a prism effect system 417 according to the first aspect of the present invention. The light fixture is substantially identical to the light fixture illustrated in FIG. 1 and identical features have been given the same reference numbers as in FIG. 1 and will not be described in further detail. In this embodiment the first multi-faceted prism 119 and the second multi-faceted prism 122 are movable in relation to each other along the optical axis. This can for instance be achieved by arranging the second activator on a longitudinal moving sled 437 which can be moved along a longitudinal track 438 by an actuator (not shown) as known in the art of entertainment light fixtures. In the neutral state this makes it possible to move the first and second multi-faceted prisms very close together whereby optical effect of the first and second prism are minimized further. Due to the physical dimensions of the multi-faceted exit surface and entrance surface the two multi-faceted prisms must be separated a small distance in order to allow the two multi-faceted prisms to rotate in relation to each other. The consequence is that a small gap between the multi-faceted exit surface and the multifaceted entrance surface occurs when the multi-faceted prism are rotatable in relation to each other. Providing mechanical components enabling the first and second multi-faceted prisms to move along the optical axis in relation to each other makes it possible to reduce this gap when the multi-faceted prisms are arranged in a neutral stage. Additionally movement of the multi-faceted prisms can also be used to create light effects, for instance by moving the multi-faceted prisms back and forth along the optical axis and in relation to each other.

Figure 5:
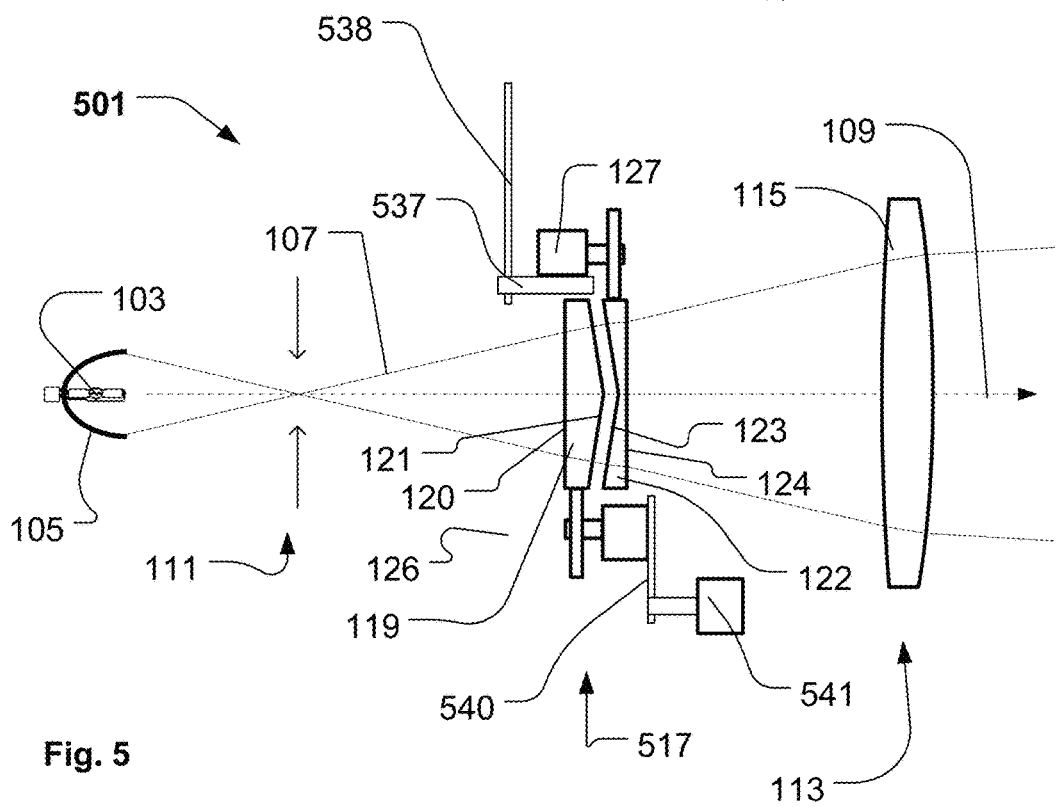
FIG. 5 illustrates a structural diagram of another embodiment of a light fixture comprising a prism effect system according to the first aspect of the present invention.

FIG. 5 illustrates a simplified structural diagram of another embodiment of a light fixture comprising a prism effect system 517 according to the first aspect of the present invention. The light fixture is substantially identical to the light fixture illustrated in FIG. 1 and identical features have been given the same reference numbers as in FIG. 1 and will not be described in further detail. In this embodiment the first multi-faceted prism 119 and the second multi-faceted prism 122 are movable transversal in relation to the optical axis. This can for instance be achieved by arranging the second actuator on a transverse moving sled 539 which can be moved along a transversal track 538 by an actuator (not shown) as known in in the art of entertainment light fixtures. This can also be achieved by arranging the first actuator on a rotating arm 540 which is rotatable by an arm rotation actuator 541. It is noticed the second actuator alternatively can be arranged on the rotating arm and that the first actuator alternatively can be arranged on a moving sled.

In another embodiment the first prism comprises a central exit facet surrounded by a plurality of peripheral exit facets, where the central exit facet is parallel with the entrance surface of the first prism and the plurality of peripheral exit facets are angled in relation to the central exit facet corresponding the second prism comprises a central entrance facet surrounded by a plurality of peripheral entrance facets, where the central entrance facet is parallel with the exit surface of the second prism and the plurality of peripheral entrance facets are angled in relation to the central entrance facet. This results in the effect that the central part of the light beam passes through the first prism and second prism without been refracted and the central part of the light beam will thus not be influenced during rotation of the first prism and second prism in relation to each other. However the light passing through the peripheral exit facets and peripheral entrance facets will be refracted in a similar way as described above.

Figure 6:
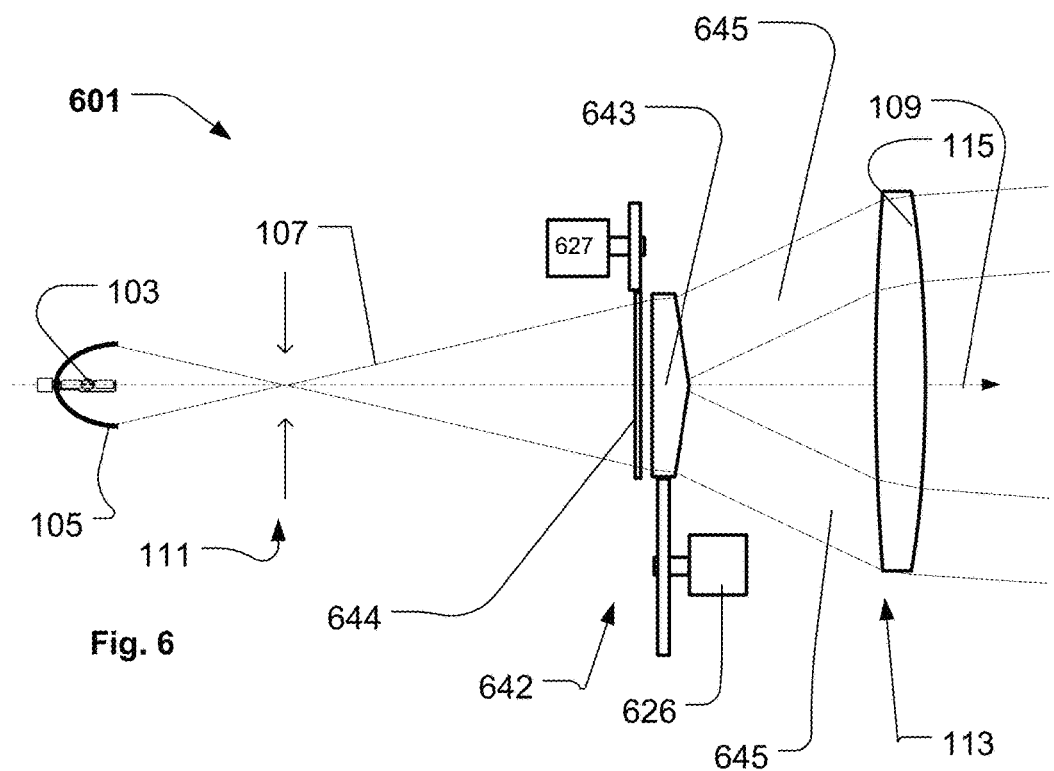
FIG. 6 illustrates a structural diagram of the light fixture comprising a prism effect system according to a second aspect of the present invention.

FIG. 6 illustrates a simplified embodiment of a light fixture comprising a prism effect system 642 according to the second aspect of the present invention. The light fixture is substantially identical to the light fixture illustrated in FIG. 1 and identical features have been given the same reference numbers as in FIG. 1 and will not be described in further detail.

The prism effect system 642 according to the second aspect of the present invention is arranged between the optical gate 111 and the optical front lens 115 and comprises a multi-faceted prism 643 and multi-regional color filter 644. The multi-regional color filter 644 comprises a plurality of color filter regions having at least two different color filtering properties. The multi-faceted prism can be any known multi-faceted prism and has been illustrated as a multi-faceted prism similar to the first multifaceted prism illustrated in the previous figures. However it is noticed that according to the second aspect of the present invention, the multi-faceted prism 643 can be any kind of multi-faceted prisms and also be provided similar to the second multi-faceted prism illustrated in the previous figures.

The plurality of color filter regions of the multi-regional color filter defines different areas of the color filter which has different color filtering properties. Different color filtering properties means that the color filter regions are configured to transmit certain colored light. The color filter regions can for instance be provided as color gels, dichroic filters, color converting material such as phosphors. It is noted that at least one of the color filter regions also can be provided as white "filter" allowing a broad range of optical wavelengths to pass in order to provide white light. The white filter regions can for instance be provided as clear or transparent areas.

The multi-faceted prism 643 and the multi-regional color filter 644 are arranged adjacent to each other meaning that the multi-faceted prism and multi-regional color filter are arranged next to each other along the optical axis in a configuration where the color regions of the multi-regional color filter are configured to filter different parts of the light beam passing through the multi-faceted prism without the other optical elements in between. In the illustrated embodiment the multi-regional color filter 644 is arranged before the multi-faceted prism along the optical axis and as a result the light beam hitting different color regions of the multi-regional color filter will be filtered differently and the different filtered parts of the light beam will enter the multi-faceted prism at different areas of the entrance surface of the multi-faceted prism. The consequence is that the different parts of the light beam refracted by the multi-faceted prism can be provided with different colors.

The multi-faceted prism is rotatable in relation to the multi-regional color filter and around an axis inside said light beam. The consequence is that different areas of the multifaceted prism will rotate into different colored parts of the light beam and the light beam parts refracted by the prism will thus change color accordingly. This can be used to create prism effects where the multi-faceted prism is configured to split the light beam into a plurality of split light beams 645 and where the color of the plurality of light beams changes as the multi-faceted prism is rotated in relation to the multi-regional color filter. A first actuator 626 is configured to rotate the multi-faceted prism as described in connection with the first actuator 126 rotating the first multi-faceted prism 119 in FIG. 1. Optionally the multi-regional color filter 644 can also be rotated inside the light beam by a second actuator 627 in a similar way as described in connection with the second actuator 126 rotating the second multi-faceted prism 122 in FIG. 1.

Figure 7:
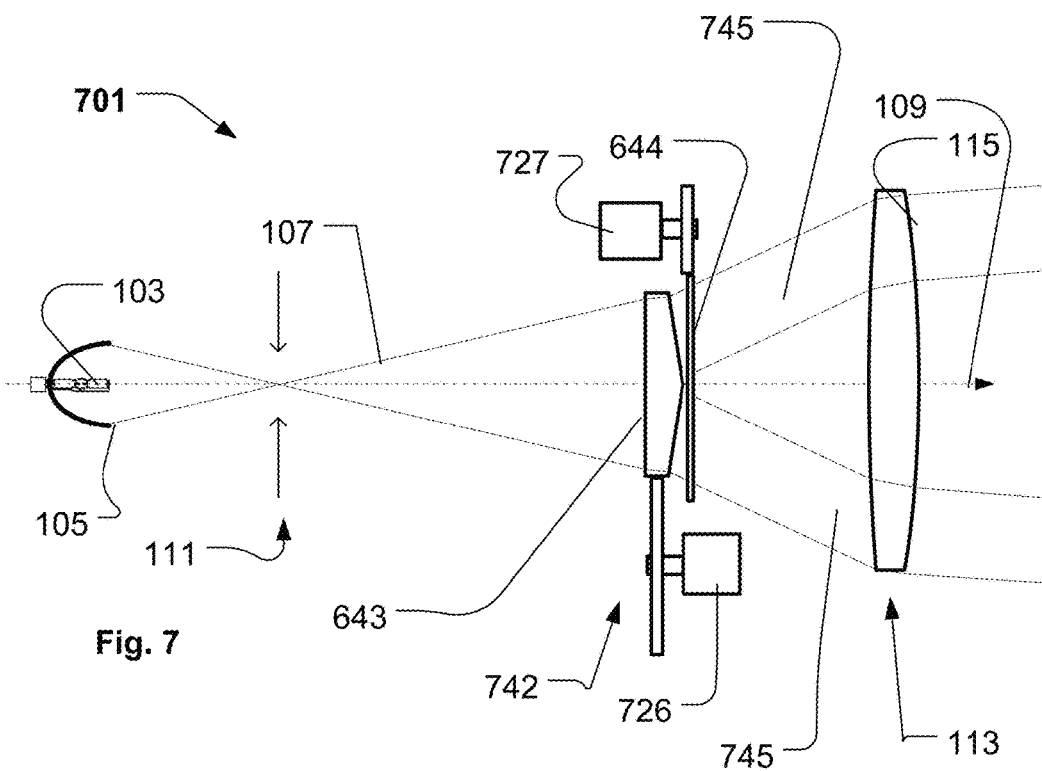
FIG. 7 illustrates a structural diagram of another embodiment of a light fixture comprising a prism effect system according to the second aspect of the present invention.

FIG. 7 illustrates a simplified embodiment of a light fixture comprising a prism effect system 742 according to the second aspect of the present invention. The light fixture is substantially identical to the light fixture illustrated in FIG. 6 and identical features have been given the same reference numbers as in FIG. 6 and will not be described in further detail.

In the illustrated embodiment the multi-regional color filter 643 is arranged just after the multi-faceted prism along the optical axis and as a result that the split light beam parts exiting the multi-faceted prism hits different color regions of the multi-regional color filter will be filtered differently. The consequence is that the different parts of the spit light beams refracted by the multi-faceted prism can be provided with different colors.

Figure 8A:
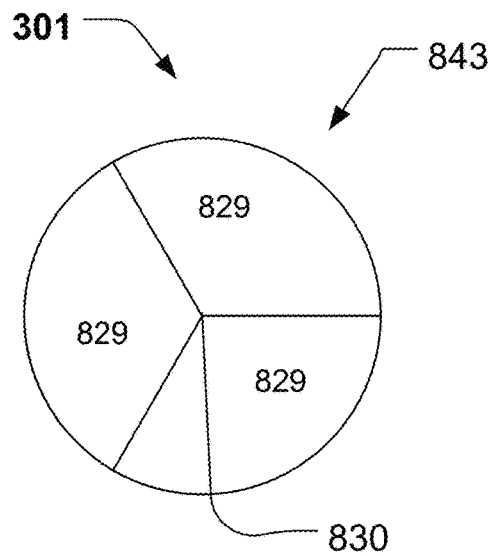
FIG. 8a-8b illustrate one embodiment of a multi-faceted prism and a multi-regional color filter pair used in the prism effect system according to the second aspect of the present invention.
Figure 8B:
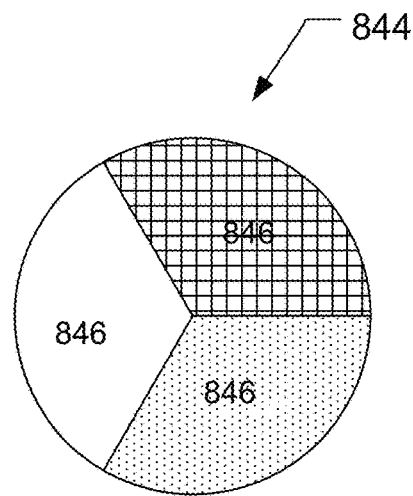

FIG. 8a-8b illustrate one embodiment of a multi-faceted prism and a multi-regional color filter pair used in the prism effect systems 642 or 742 according to the second aspect of the present invention. FIG. 8a illustrates a top view (seen from the optical axis) of the multi-faceted prism 843 and FIG. 8b illustrates a top view of the multi-regional color filter 843. The multi-faceted prism is a 3-faceted prism similar to the one illustrated in FIG. 2a and is provided with a flat entrance surface and the exit surface comprises three exit facets 829. The three exits facets are provided in a convex setting where the exit facets meet in a common point 830 protruding in relation to the prism. The multi-regional color filter comprises three color regions 846 having different color filter properties (illustrated as different shadings). In this embodiment the number of color filter regions equals the numbers of facets and the color regions have substantially the same extend as the facets of multi-faceted prism. This results in the fact that the split light beams created by each facet of the multi-faceted prism can be provided with the same color. This can be achieved by arranging the multi-faceted prism and the multi-regional color filter such that each color filter region is aligned with a corresponding facet. As a result the light refracted by each facet will be filter by a corresponding color filter. In one embodiment the multi-faceted prism and the multi-regional filter can be rotated simultaneously around the same axis and the split light beams can thus be rotated in relation to each other due to the rotating multi-faceted prism while the color of the different split light beams can be maintained.

Figure 9A:
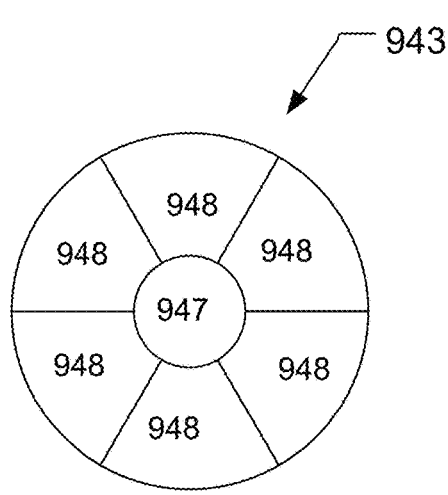
FIG. 9a-9b illustrate one embodiment of a multi-faceted prism and a multi-regional color filter pair used in the prism effect system according to the second aspect of the present invention.
Figure 9B:
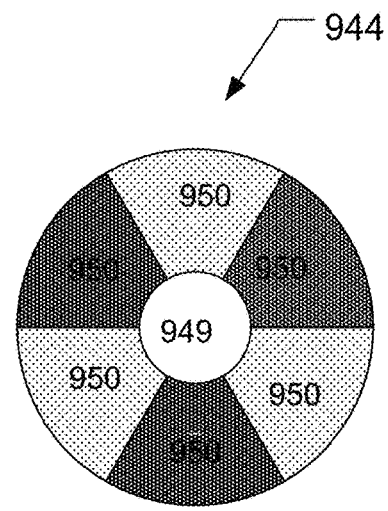

FIG. 9a-9b illustrate another embodiment of a multi-faceted prism and a multi-regional color filter pair used in the prism effect system 642 or 742 according to the second aspect of the present invention. FIG. 9a illustrates a top view (seen from the optical axis) of the multi-faceted prism 943 and FIG. 9b illustrates a top view of the multi-regional color filter 943. The multi-faceted prism is a 7-faceted prism comprising a flat entrance surface and an exit surface comprising a central facet 947 surrounded by 6 peripheral facets. The central facet is substantial parallel with the flat entrance surface and the peripheral facets 948 are angled in relation the central facet 947. The peripheral facets of multi-facet prism will refract the light beam into 6 split light beams surrounding a central split light beam provided by light passing through the central facet. The multi-regional color filter comprises a central color region 949 surrounded by 6 peripheral color regions 950 (illustrated as different shadings). The peripheral color regions are provided with the same color filtering properties at every second color region. The consequence is the fact that upon rotation of the multi-regional color filter in relation to the multi-faceted prism result in the fact that the color of the split light beams created by the peripheral facets alternately will change color however the color of the central beam will not change.

It is noticed that the illustrated combinations for multi-faceted prisms and multi-regional color filters are illustrating a few examples only and the many other combinations multi-faceted prisms and multi-regional color filters can be provided. For instance the number of facets can be provided as desired and the colors of the color regions can be chosen as desired. It is also noticed that the facets of the multi-faceted prism can be provided with color filtering properties and the color of the split light beams will thus be provided as a combination of the color filtering properties of the multi-regional color filter and the color filtering properties of the facets. Additionally in the illustrated embodiments the prisms and color filters rotates around the optical axis, however it is noticed that the prisms and color filters can rotate around any axis inside the light beam and parallel to the optical axis. This does also apply to first aspect of the present invention where the inverted multi-faceted prisms rotate inside the light beam and around any axis parallel to the optical axis.

Figure 10:
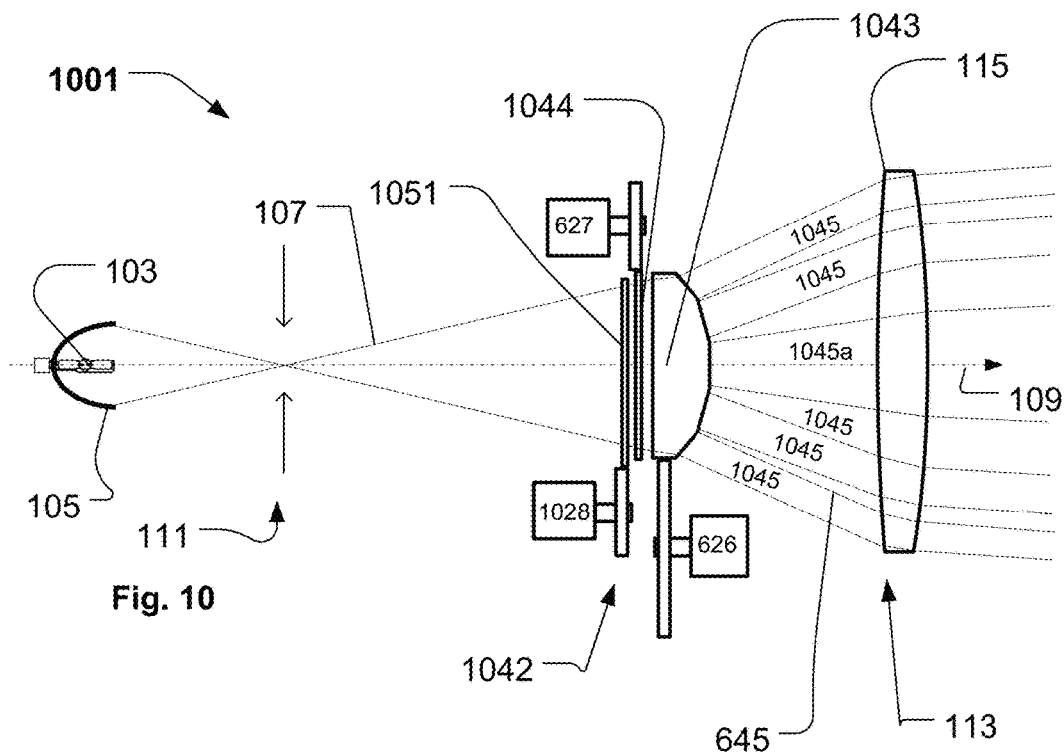
FIG. 10 illustrates a structural diagram of another embodiment of a light fixture comprising a prism effect system according to the second aspect of the present invention.

FIG. 10 illustrates a simplified structural diagram of and embodiment of a light fixture comprising a prism effect system 1042 according to the second aspect of the present invention. The light fixture is substantially identical to the light fixture illustrated in FIG. 6 and identical features have been given the same reference numbers as in FIG. 6 and will not be described in further detail.

The prism effect system 1042 according to the second aspect of the present invention is arranged between the optical gate 111 and the optical front lens 115 and comprises a multi-faceted prism 1043, a multi-regional color filter 1044 and an additional multi-regional color filter 1051. Each of the multi-regional color filter 1044 and the additional multi-regional color filter 1051 comprises a plurality of color filter regions having at least two different color filtering properties.

The multi-faceted prism 1043 and the multi-regional color filter functions in a similar way as the multi-faceted prism 643 and the multi-regional color filter as described in FIG. 6, but have been embodied slightly different. The additional multi-regional color filter forms part of the prism effect system 1042 and have been arranged adjacent to the multi-regional color filter 1044. However it is noticed that the additional multi-regional color filter alternatively can be arrange at the light output side of the multi-faceted prism. Also the order of the multi-regional color filter 1042 and the additional multi-regional color filter can be reversed.

A top view (seen from the optical axis) of the multi-faceted prism 1043 is shown in 11c. The multi-faceted prism is a 19-faceted prism comprising a flat entrance surface and an exit surface comprising a central facet 1047 surrounded by 12 peripheral facets 1048 and where 6 middle facets 1052 are provided between the central facet and the peripheral facets. The central facet is substantial parallel with the flat entrance surface and the middle facets 1052 and the peripheral facets 1048 are angled in relation the central facet 1047. The middle 1052 and peripheral 1048 facets of multi-facet prism refract the light beam 107 into 18 split light beams 1045 surrounding a central split light beam 1045a provided by light passing through the central facet.

Figure 11A:
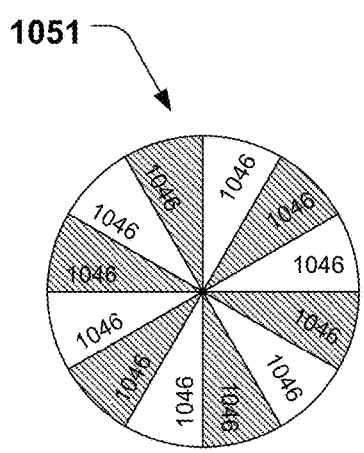
FIG. 11a-11c illustrate embodiments of the additional multi-regional color filter, the multi-regional color filter and the multi-faceted prism used in the prism effect system illustrated in FIG. 10.
Figure 11B:
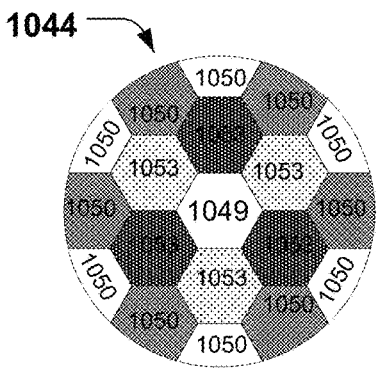
Figure 11C:
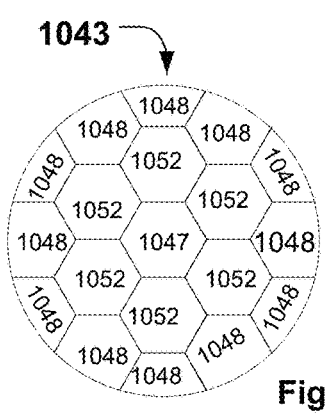

A top view (seen from the optical axis) of the multi-regional color filter 1044 is shown in FIG. 11b. The multi-regional color filter 1044 comprises a central color region 1049 surrounded by 12 peripheral color regions 1050 and 6 middle color regions 1053 are provided between the central color region and the peripheral color regions. The number of color filter regions equals of the multi-regional filter equals the numbers of facets of the multi-faceted prism and the color regions have substantially the same extend as the facets of multi-faceted prism. As described previously this makes it possible to apply a color filtering effect to the light of a corresponding split light beam.

A top view (seen from the optical axis) of the additional multi-regional color filter 1051 is shown in FIG. 11a. The additional multi-regional color filter 1051 comprises 12 color filter regions 1046 arranged in a pie shaped pattern where every second color filter region has the same color filtering properties. The additional multi-regional color filter 1051 can also be rotated inside the light beam by a third actuator 1028. The additional multi-regional color filter 1051 can be used to provide additional color effects to the split light beam as the color filters of the two multi-regional color filters can be combined and thereby provide combined color filtering of the light beam. Additionally the two multi-regional color filters can be rotated in relation to each other whereby dynamic color effects can be provided to the split light beams. For instance in one embodiment the multi-regional color filter 1043 is configured to rotate simultaneous with the multi-faceted prism 1043 in a position where the color filter regions of the multi-regional prism is arranged below a corresponding facet of the multi-faceted prism. This results in the effect that the color filters of the multi-regional color filter 1044 provide the same color filtering effect to the light being refracted by the same facet and each of the corresponding split light beams only have one color. Rotation of the additional multi-regional color filter 1051 in relation to the multi-regional color filter 1044 and the multi-faceted prism 1043 results in the effect that the color region 1046 alternately is combined with the color regions of the multi-regional filter 1044 and the colors of the split light beam are thus also alternately changed.

In the embodiments comprising the prism effect system according to the second aspect of the present invention the multi-facets prism and multi-regional color filter can also be configured to move transversally in relation the optical axis in order to move the multi-faceted prism and multi-regional color filter out of the light beam.

Figure 12:
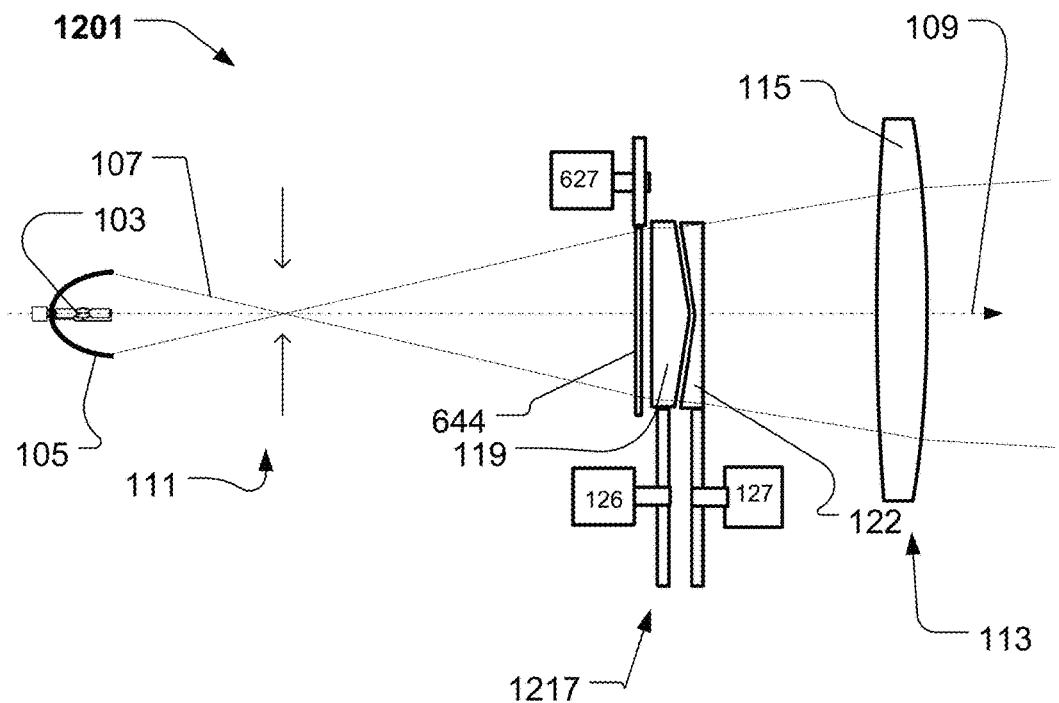
FIG. 12 illustrates a structural diagram of a light fixture comprising a prism effect system combining the first and second aspects of the present invention.

FIG. 12 illustrates a simplified structural diagram of a light fixture 1201 comprising a prism effect system 1217 combining the first and second aspect of the present invention. The light fixture 1201 is substantially identical to the light fixtures illustrated in FIG. 1 and FIG. 6. Identical features have been given the same reference numbers as in FIGS. 1 and 6 and will not be described in further detail.

The prism effect system 1217 has been provided as a combination of the prism effect systems 117 illustrated in FIG. 1 and the prism effect system 642 illustrated in FIG. 6. The combined prism effect system has been provided by arranging the multi-regional color filter 644 adjacent the first multi-faceted prism in a similar way as described in connection with FIG. 6. The combined prism effect system makes it possible to provide color effects to the split light beams created by the prism effect system 117. For instance the bright spots shown in the light distributions of FIG. 3a-3e can be given various colors.

Figure 13:
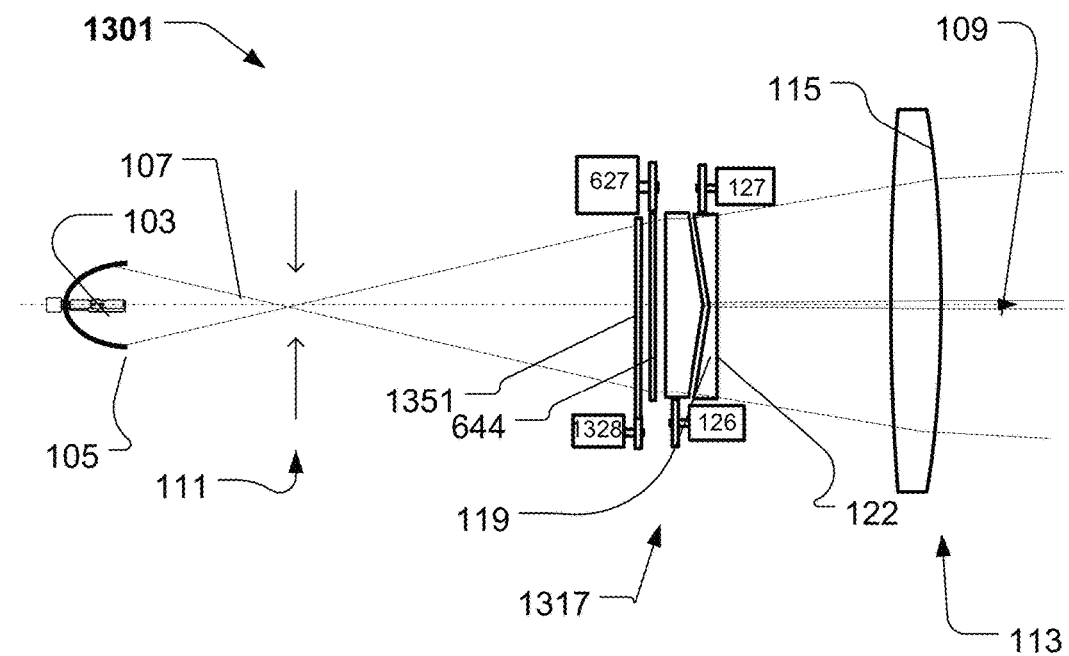
FIG. 13 illustrates a structural diagram of another embodiment of a light fixture comprising a prism effect system combining the first and second aspects of the present invention.

FIG. 13 illustrates a simplified structural diagram of a light fixture 1301 comprising a prism effect system 1317 combining the first and second aspect of the present invention. The light fixture 1301 is substantially identical to the light fixture illustrated in FIG. 12 and identical features have been given the same reference numbers as in FIG. 12. The prism effect system 1317 comprises an additional multi-regional color filter 1351 which can be rotated inside the light beam by an actuator 1328. This makes it possible to provide additional color effects to the split light beams created by the prism effect system illustrated in FIG. 1.

It is noticed that FIG. 12 and FIG. 13 only show exemplary embodiments of a prism effects systems combining the first and second aspect of the present invention.

Figure 14:
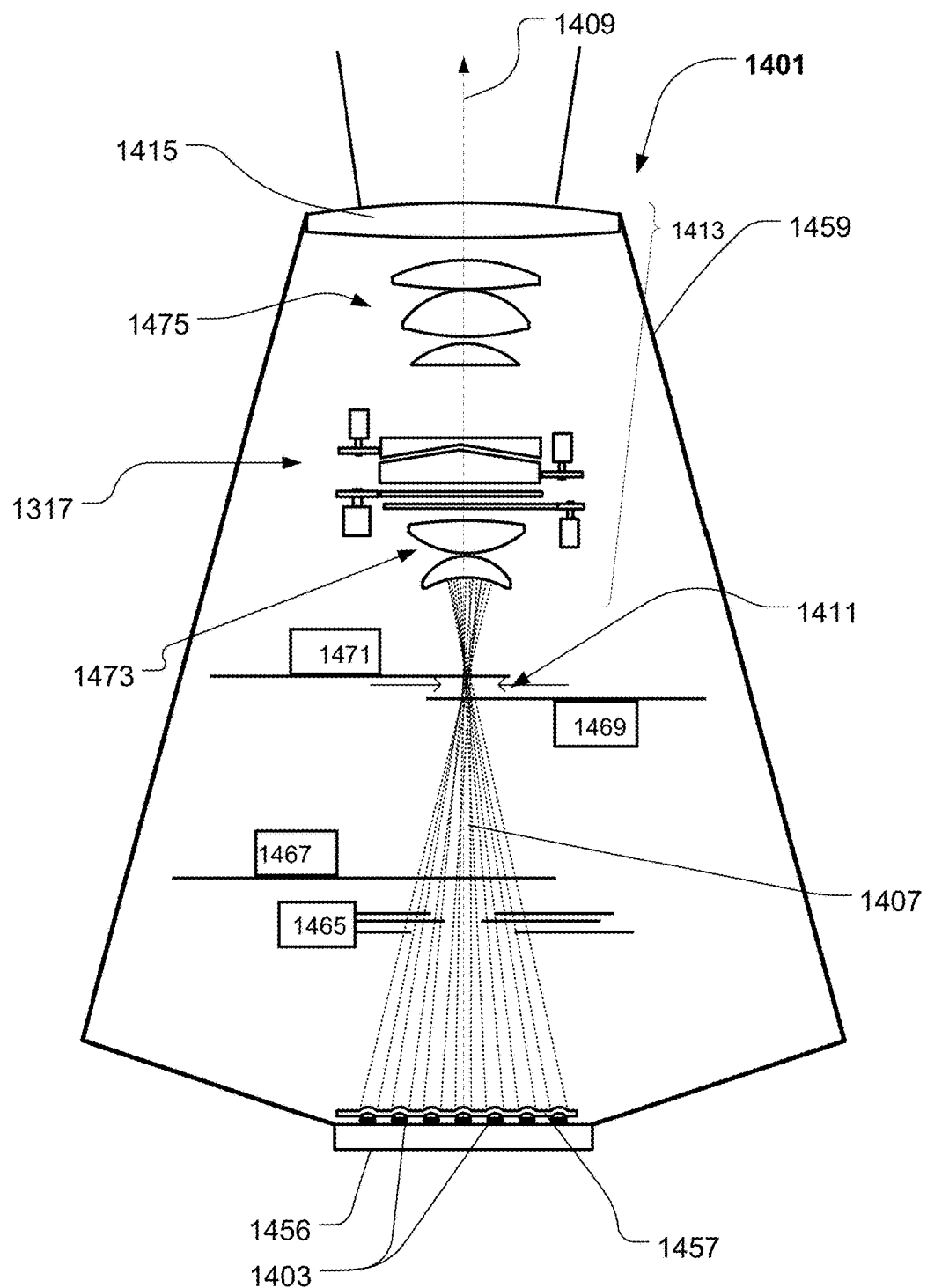
FIG. 14 illustrates a structural diagram of a light fixture comprising a prism effect system according to the present invention.

FIG. 14 illustrates a structural diagram of a light fixture 1401 comprising a prism effect system 1317 according to the first and second aspect of the present invention. The prism effect system 1317 is similar to the prism effect system shown in FIG. 13 and will not be described in further detail. However it is noticed that any prism effect system according to the first and/or second aspect of the present invention can be used. The light fixture comprises a plurality of light sources 1403 formed as LEDs arranged on a heat sink 1456, a light collector 1457, an optical gate 1411 and an optical assembly 1413. The light sources and heat sink are arranged at the bottom part of a lamp housing 1459 of the light fixture and the other components are arranged inside the lamp housing 1459. The light collector 1457 is adapted to collect light from the LEDs 1403 and to convert the collected light into a plurality of light beams 1407 (dotted lines) propagating along the optical axis 1407 (dash-dotted line). The light collector can be embodied as any optical means capable of collecting at least a part of the light emitted by the LEDs and convert the collected light to light beams. In the illustrated embodiment the light collector comprises a number of lenslets each collecting light from one of the LEDs and converting the light into a corresponding light beam. However it is noticed that the light collector also can be embodied as a single optical lens, a Fresnel lens, a number of TIR lenses (total reflection lenses), a number of light rods etc. or combinations thereof. It is understood that light beams propagating along the optical axis contain rays of light propagating at an angle, e.g. an angle less than 45 degrees to the optical axis. The light collector may be configured to fill the optical gate 1411 with light from the light sources 1403 so that the area, i.e. the aperture, of the optical gate 1411 is illuminated with a uniform intensity or optimized for max output. The optical gate 1411 is arranged along the optical axis 1409

The optical assembly 1413 may be configured to collect at least a part of the light beams transmitted through the optical gate 1411 and to image the optical gate at a distance along the optical axis. For example, the optical assembly 1413 may be configured to image the optical gate 1411 onto some object such as a screen, e.g. a screen on a concert stage. A certain image, e.g. some opaque pattern provided on a transparent window, an open pattern in a non-transparent material, or imaging object such as GOBOs known in the field of entertainment lighting, may be contained within the optical gate 1411 so that that the illuminated image can be imaged by the optical assembly. Accordingly, the light fixture 1401 may be used for entertainment lighting.

In the illustrated embodiment the light is directed along the optical axis 1409 by the light collector 1457 and passes through a number of light effects before exiting the light fixture through a front lens 1415. The light effects can for instance be any light effects known in the art of intelligent/ entertainments lighting for instance, a CMY color mixing system 1465, color filters 1467, gobos 1469 animation effects 1471, an iris diaphragm (not shown), a focus lens group 1473 zoom lens group 1475 prism effect 1473, framing effects (not shown), or any other light effects known in the art. The mentioned light effects only serve to illustrate the principles of an illuminating device for entertainment lighting and the person skilled in the art of entertainment lighting will be able to construct other variations with additional or less light effects. Further it is noticed that the order and positions of the light effects can be changed. The light fixture comprises a prism effect system 1317 similar to the prism effect system illustrated in FIG. 13 and will not be described in further details. However it is to be understood that the light fixture can comprise any prism effect system according to the first and second aspect of the present invention for instance any of the prism effect systems shown throughout this application. The prism effect system 1317 is arranged between the optical focus group 1473 and the optical zoom group. The prism effect system 1317 can in one embodiment be configured to move simultaneous with the optical focus group. For instance by arranging the prism system and focus group on the same moving sled moving along the optical axis.

Figure 15:
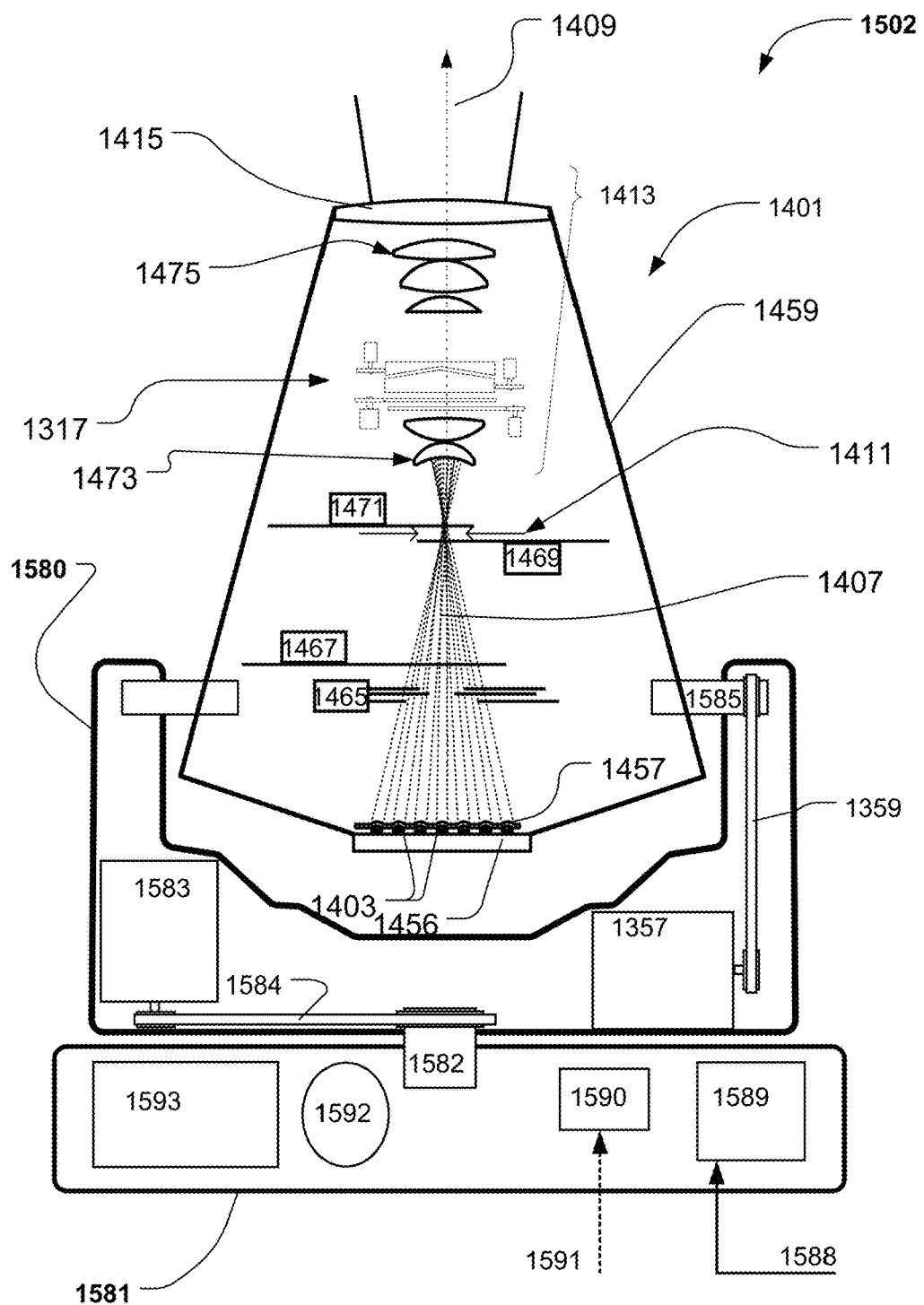
FIG. 15 illustrates a structural diagram of a moving head light fixture comprising a prism effect system according to the present invention.

FIG. 15 illustrates a structural diagram of a moving head light fixture 1502 comprising a head rotatable connected to a yoke 1580 where the yoke is rotatable connected to a base 1581. The head is substantially identical to the light fixture shown 1401 in FIG. 14 and substantial identical features are labeled with the same reference numbers as in FIG. 14 and will not be described further. The moving head light fixture comprises pan rotating means for rotating the yoke in relation to the base, for instance by rotating a pan shaft 1582 connected to the yoke and arranged in a bearing (not shown) in the base. A pan motor 1583 is connected to the pan shaft 1582 through a pan belt 1584 and is configured to rotate the shaft and yoke in relation to the base through the pan belt. The moving head light fixture comprises tilt rotating means for rotating the head in relation to the yoke, for instance by rotating a tilt shaft 1585 connected to the head and arranged in a bearing (not shown) in the yoke. A tilt motor 1586 is connected to the tilt shaft 1585 through a tilt belt 1587 and is configured to rotate the shaft and head in relation to the yoke through the tilt belt. The skilled person will realize that the pan and tilt rotation means can be constructed in many different ways using mechanical components such as motors, shafts, gears, cables, chains, transmission systems, bearings etc. Alternatively it is noticed that it also is possible to arrange the pan motor in the base and/or arrange the tilt motor in the head.

As known in the prior art the moving head light fixture receives electrical power 1588 from an external power supply (not shown). The electrical power is received by an internal power supply 1589 which adapts and distributes electrical power through internal power lines (not shown) to the subsystems of the moving head. The internal power system can be constructed in many different ways for instance by connecting all subsystems to the same power line. The skilled person will however realize that some of the subsystems in the moving head need different kind of power and that a ground line also can be used. The light source will for instance in most applications need a different kind of power than step motors and driver circuits.

The light fixture comprises also a controller 1590 which controls the components (other subsystems) in the light fixture based on an input signal 1591 indicative light effect parameters, position parameters and other parameters related to the moving head lighting fixture. The controller receives the input signal from a light controller (not shown) as known in the art of intelligent and entertainment lighting for instance by using a standard protocol like DMX, Art-NET, RDM etc. Typically the light effect parameter is indicative of at least one light effect parameter related to the different light effects in the light system. The controller 1590 is adapted to send commands and instructions to the different subsystems of the moving head through internal communication lines (not shown). The internal communication system can be based on a various type of communications networks/systems. It is noticed that the light fixture illustrated in FIG. 14 also comprise a controller configured to control the components of the light fixture.

The moving head can also comprise user input means enabling a user to interact directly with the moving head instead of using a light controller to communicate with the moving head. The user input means 1592 can for instance be bottoms, joysticks, touch pads, keyboard, mouse etc. The user input means can also be supported by a display 1593 enabling the user to interact with the moving head through a menu system shown on the display using the user input means. The display device and user input means can in one embodiment also be integrated as a touch screen.

The input signal can be indicative of at least one prism effect parameter and the controller can be configured to control the prism effect system 1317 according to the prism effect parameter. For instance the prism effect parameter can be indicative of a rotation speed of the multi-facets prisms and/or multi-regional color filters, the prism effect parameter can also be indicative of the fact that the multi-regional color filter shall rotate simultaneously with the multi-faceted prism. The prism effect parameter can also be indicative of a number of predefined prism effects and the controller can be preprogrammed to control the prism effect system in predefined ways.

The invention claimed is:

1. A light fixture comprising:
   at least one light source generating light;
   a light collector configured to collect at least a part of said light and to convert said light into a light beam propagating a long an optical axis, where said light beam is concentrated at an optical gate arranged along said optical axis;
   at least one beam modifying object arranged near said optical gate and configured to shape the light beam;
   an optical assembly comprising at least one optical front lens, said optical assembly is configured to project at least a part of said light beam along said optical axis;
   a prism effect system arranged between said optical gate and said optical front lens, said prism effect system comprising:
      a first prism comprising an entrance surface and a multi-faceted exit surface;
      a second prism comprising a multi-faceted entrance surface and an exit surface; and
   a multi-regional color filter comprising a plurality of color filter regions having at least two different color filtering properties, wherein said multi-regional color filter is arranged adjacent to at least one of said first prism and said second prism;

wherein said entrance surface of said first prism faces towards said at least one light source and said multi-faceted entrance surface of said second prism faces said multi-faceted exit surface of said first prism, wherein said first prism and second prism are rotatable in relation to each other around an axis parallel to said optical axis, and wherein said multi-faceted exit surface of said first prism and said multi-faceted entrance surface comprise an identical number of inverted facets, wherein the number of color filter regions associated with said multi-regional color filter equals the number of facets at said first prism and said second prism, and wherein said color filter regions have substantially the same extent as said facets of said first prism and second prism, wherein said at least one light source, said light collector, said at least one beam modifying object, said optical assembly, said prism effect system, and said multi-regional color filter are arranged inside a lamp housing, and wherein said light beam exits said lamp housing through said at least one optical front lens.

2. The light fixture according to claim 1, wherein said first prism and said second prism are arranged in a neutral position, wherein, in said neutral position, said facets of said first prism and second prism are brought into pairs and surfaces of each facet pair are parallel to one another.

3. The light fixture according to claim 2, wherein said first prism and said second prism are movable in relation to each other along said optical axis.

4. The light fixture according to claim 1, wherein said first prism and said second prism are movable in relation to each other along said optical axis.

5. The light fixture according to claim 1, wherein at least one of said first prism and said second prism is rotatable in relation to said multi-regional color filter and around an axis inside said light beam.

6. The light fixture according to claim 1, wherein said optical assembly further comprises an optical focus group comprising at least one optical focus lens, and wherein said prism effect system is arranged between said optical focus group and said front lens.

7. The light fixture according to claim 6, wherein said optical focus group and said prism effect system are moveable simultaneously along said optical axis.

8. The light fixture according to claim 1, wherein said first prism and second prism are rotatable in relation to each other around said optical axis.

9. The light fixture according to claim 1, wherein said facets of said multi-faceted exit surface of said first prism meet in a common point protruding in relation to said first prism, and said facets of said multi-faceted entrance surface of said second prism meet in a common point depressing into said second prism.

10. The light fixture according to claim 1, wherein said first prism comprises a central exit facet surrounded by a plurality of peripheral exit facets, where said central exit facet is parallel to said entrance surface of said first prism, and said plurality of peripheral exit facets are angled in relation to said central exit facet, and said second prism comprises a central entrance facet surrounded by a plurality of peripheral entrance facets, where said central entrance facet is parallel to said exit surface of said second prism, and said plurality of peripheral entrance facets are angled in relation to said central entrance facet.

11. A method of creating a light effect, comprising:
generating light using at least one light source;
generating a light beam propagating along an optical axis using at least one light collector configured to collect at least a part of said light,
concentrating said light beam at an optical gate along said optical axis using the at least one light collector,
shaping said light beam near said optical gate using at least one beam modifying object;
projecting said light beam along said optical axis using an optical assembly comprising at least one optical front lens; and
rotating a first prism and a second prism in relation to each other inside said light beam at a position between said optical gate and said optical front lens,
wherein said first prism comprises an entrance surface and a multi-faceted exit surface, and said second prism comprises a multi-faceted entrance surface and an exit surface, and wherein said multi-faceted exit surface of said first prism and said multi-faceted entrance surface comprise an identical number of inverted facets;
wherein a multi-regional color filter is arranged adjacent to at least one of said first prism and said second prism, wherein said multi-regional color filter comprises a plurality of color filter regions having at least two different color filtering properties, and wherein the number of color filter regions associated with said multi-regional color filter equals the number of facets at said first prism and second prism, and wherein said color filter regions have substantially the same extent as said facets of said first prism and second prism; and
wherein said at least one light source, said light collector, said at least one beam modifying object, said optical assembly, said first prism, said second prism, and said multi-regional color filter are arranged inside a lamp housing, and where said light beam exits said lamp housing through said at least one optical front lens.

12. The method of creating light effects according to claim 11, further comprising arranging said first prism and said second prism in a neutral position, wherein, in said neutral position, said facets of said first and second prism are brought into pairs and surface of each facet pair are parallel to one another.

13. The method of creating light effect according to claim 11, further comprising rotating the multi-regional color filter in relation to at least said first prism or said second prism inside said light beam at a position adjacent to a prism effect system.

14. The method of creating light effects according to claim 11, further comprising moving said first and second prisms in relation to each other along said optical axis.

* * * * *